United States Patent [19]

Beckmann et al.

[11] Patent Number: 4,908,167

[45] Date of Patent: Mar. 13, 1990

[54] METHOD FOR PRODUCING FORM BODIES, SUCH AS BRIQUETTES

[75] Inventors: Franz Beckmann, Wuerselen, Fed. Rep. of Germany; Armand Wagner, Esch-sur-Alzette, Luxembourg

[73] Assignee: Laborlux S. A., Esch-sur Alzette, Luxembourg

[21] Appl. No.: 323,440

[22] Filed: Mar. 14, 1989

[30] Foreign Application Priority Data

Mar. 22, 1988 [DE] Fed. Rep. of Germany ....... 3809616

[51] Int. Cl.$^4$ .................. C01B 31/02; C10L 5/14; C10L 5/16
[52] U.S. Cl. ........................ 264/29.3; 44/19; 44/21; 44/23; 44/25; 44/591; 44/597; 44/599; 264/117; 264/122; 264/125
[58] Field of Search ............ 264/29.1, 29.3, 29.5, 264/43, 44, 117, 122, 123, 125, 126, DIG. 20, DIG. 25, 102; 44/15 R, 16 R, 19, 21, 23, 25, 26, 550, 591, 593, 596, 597, 599

[56] References Cited

U.S. PATENT DOCUMENTS

| | | | |
|---|---|---|---|
| 2,314,641 | 3/1943 | Wolf | 44/16 R X |
| 2,824,790 | 2/1958 | Gregory et al. | 44/19 |
| 3,077,439 | 2/1963 | Shea, Jr. et al. | 264/29.3 |
| 3,213,169 | 10/1965 | Kardaun et al. | 264/122 |
| 3,403,989 | 10/1968 | Blake et al. | 44/23 |
| 3,651,179 | 3/1972 | Shea, Jr. et al. | 264/29.3 |
| 3,966,427 | 6/1976 | Herment et al. | 44/19 |
| 4,360,487 | 11/1982 | Janusch | 264/117 X |

FOREIGN PATENT DOCUMENTS

| | | | |
|---|---|---|---|
| 53-97001 | 8/1978 | Japan | 44/23 |
| 2157312 | 11/1987 | United Kingdom . | |

OTHER PUBLICATIONS

Deutsche Norm, Dec. 1983 "Bitumen and Steinkohlenteerpech" DIN 55 946, Teil I and Teil 2.

*Primary Examiner*—Jeffery Thurlow
*Assistant Examiner*—Leo B. Tentoni
*Attorney, Agent, or Firm*—W. G. Fasse; D. H. Kane, Jr.

[57] ABSTRACT

Form or pressed bodies, such as briquettes, are made of a mixture including at least two components. A first component is formed by at least one fine grained solid material which does not soften below 800° C. A second component is formed by at least one binding agent that is pyrolytically decomposable. Each of the components has a mean mixing and deformation temperature such that the mean temperature of the first component is above a standard mixing and deforming temperature while the mean temperature of the second component is below the standard temperature. The standard temperature is such that a pyrolysis and degassing performed at the standard temperature does not destroy the binding ability of the second component. The second component constitutes about 15% by weight to about 50% by weight of the total mixture. Further, the second component is at least partly a liquified bituminous material having a mean CCT-value above 20%. With these conditions satisfied, it is assured that solid, heat resistant, carbon containing form bodies can be made of the so prepared mixture without requiring the use of baking hard or bituminous coal and without the need for an expensive follow-up coking. The mixture is continuously maintained in motion while it is being subjected to distillation and pyrolysis, whereby gases are removed from the mixture. As soon as a solidification and coke formation is noticed in the pyrolytically decomposed bituminous material, the form bodies are produced by pressing at temperatures within the range of 460° to 590° C. at conventional pressures.

6 Claims, No Drawings

METHOD FOR PRODUCING FORM BODIES, SUCH AS BRIQUETTES

FIELD OF THE INVENTION

The invention relates to a method for producing form bodies, such as briquettes, by preparing a mixture of two components, each of which may include one or more ingredients.

BACKGROUND INFORMATION

Form bodies, such as briquettes, have been manufactured heretofore of a two-component mixture, whereby the first component comprises at least one fine grained solid material which does not soften below 800° C. A second component comprises at least one pyrolytically decomposable binding material The mixture has a uniform or standard mixing and deformation temperature. However, the mean mixing and deformation temperature of the first component is above the standard temperature while the respective temperature of the second component is below the standard temperature. The standard or uniform mixing and deformation temperature of the mixture is such that a pyrolytic treatment and degassing of the mixture does not destroy the binding ability of the second component constituting a binding agent.

British Pat. Publication (GB) 2,157,312 B describes such a method wherein the deformable plastic mixture made of a first component comprising substantially thermally stable ingredients and a second component in the form of a pyrolytically decomposable coking hard coal, is treated in a travelling bed reactor which constantly subjects the mixture to a mixing and kneading motion. The travelling bed reactor conveys the mixture to a briquetting press which converts the mixture into form bodies by pressing. The briquetting takes place as a so-called hot briquetting and the so-produced form bodies containing coke and mixed cokes, already have a rigid, heat resistant skeleton of low temperature carbonization coke. If the temperature of the form bodies is maintained for a certain dwell time at the pressing temperature, the breaking and abrasion strength of the form bodies is increased to values which even surpass the strength values of normal lump coke produced by high temperature coking methods.

When briquettes or form bodies manufactured according to British Pat. Publication (GB) 2,157,312 B are burned, they leave an undesired ash component. This ash residue is due to the fact that the form bodies have been made by using coking hard coal as the binding agent or ingredient. Such an ash residue is especially disadvantageous if the form bodies, which have been produced with the aid of coking coal as a binder component and which contain in addition to the carbon, other ingredients such as quartz, heavy metal oxides, lime, and corresponding materials are to be used for the production of metals such as silicon or carbides, for example, calcium carbide in an electric furnace. For example, it is impossible to produce pure raw silicon by using sand and carbon containing form bodies which were produced by employing coking hard coal as the binder agent.

It is also known to manufacture form bodies of fine grained solid materials and of a binder agent in the form of liquified bituminous materials instead of the coking hard coal. Such liquified bituminous materials are defined in German Industrial Standards (DIN 55946).

The liquified bituminous materials are mixed with the fine grained solid materials and kneaded prior to their pressing. The mixing temperature, or rather the temperature at which the mixing takes place, is below the temperature at which the bituminous materials would thermally decompose. The mixing and kneading results in a deformable plastic mixture which is introduced into a briquetting apparatus for pressing the form or mold bodies. The so-produced form bodies do not leave an undesirable ash component. However, the so formed bodies lose their strength or rigidity when they are heated so that they require a gentle treatment during any further processing. Where it is necessary that these form bodies must have a sufficiently heat resistant coke skeleton, it is required to perform a follow-up coking treatment. Thus, it has been suggested that form bodies which are used as reduction agents in the production of metals or carbides, are subjected to the follow-up coking in the reduction furnace itself. However, this suggestion has not been found to be feasible in practice.

OBJECTS OF THE INVENTION

In view of the above it is the aim of the invention to achieve the following objects singly or in combination:

to provide a method for the production of form bodies which contain carbon, yet are heat resistant, e.g. coke and mixed coke;

to produce form bodies which do not require the use of coking hard coal, nor do they normally require an expensive follow-up coking treatment;

to produce form bodies which have a maximal strength and shape retaining ability; and to provide form bodies which have an excellent drum resistance, an excellent scuff resistance, and a low porosity.

SUMMARY OF THE INVENTION

According to the invention a two component mixture is prepared by mixing 50% to 85% by weight of a first component and 50% to 15% by weight of a second component with each other. The first component includes at least one fine grained solid material that has a softening temperature above 800° C. The first component also has a first mean or average mixing and deformation temperature which is above the uniform or standard mixing and deformation temperature of the mixture. The second component of the mixture includes at least one pyrolytically decomposable binding agent or material having a second mean or average mixing and deformation temperature which is below the uniform or standard mixing and deformation temperature of the mixture. The mixture is then sufficiently heated to the uniform or standard mixing temperature to perform a pyrolysis and degassing of the second component without destroying the binding ability of the binding agent of the second component. The second component is an at least partially liquified bituminous material having a mean CCT-value above 20%. The mixture is kept continuously in motion during the pyrolytic and degassing treatment for about 2 to 20 minutes so that any produced gases are removed from the bituminous material. The pyrolytically treated and degassed bituminous mixture is immediately subjected to the pressing of the form bodies at a temperature within the range of 460° C. to 590° C. ±50° C., as soon as a solidification and coking has started in the pyrolytically decomposed bituminous material.

DETAILED DESCRIPTION OF PREFERRING EXAMPLE EMBODIMENTS AND OF THE BEST MODE OF THE INVENTION

The liquified bituminous materials are supplied into the mixture at a temperature which is about or below the boiling point of the liquified bituminous material. The fine grained solid materials, on the other hand, are heated prior to their introduction into the mixture to such a degree that as a result of the mixing the desired mixing temperature is established. If the two components are supplied as more than two material flows, which may be the case, especially for the fine grained solid materials, the resulting and desired mixing temperature will be established on the basis of the heat content of the individual material flows, whereby these material flows may have the same or even different heat contents.

The mixing temperature is thus in the lower zone of the range in which a pyrolysis of the bituminuous materials takes place, namely, in the temperature range of the so-called low temperature carbonization or low temperature coking of 520°±60° C. Temperatures above this range are avoided because the pyrolysis would be too intense and temperatures below this range are also avoided because the pyrolysis would take place too slowly or not at all. The desired pyrolysis, that is, the desired thermal decomposition speed of the bituminous materials, also varies with the material ingredients of the second component. Bituminous materials having a high proportion of condensated ring compounds require naturally a higher decomposition temperature than bituminous materials having a small proportion of such condensated ring compounds. The bituminous materials should have a coking residue, as high as possible. The mean or average CCT-value (Conradson Carbon Test ASTMD 189-46) of the bituminous materials used herein is thus above 20%. Where it is desired to use bituminous materials having an especially low sulfur content, it is suggested to use hard pitch made of hard coal tar. For other instances it has been found to be advantageous to use cracked bituminous materials made of crude oil. The volatile pyrolysis products are discharged as part of stable compounds that form part of the bituminous materials. Such stable compounds do not decompose during the pyrolysis, but vaporize in accordance with their boiling point when they are exposed to the mixing temperature. The gas discharged during the pyrolysis, referred to as the so-called mixer gas, also contains the volatile materials contained in the solid component or components which do not soften below 800° C. These volatile ingredients or materials are separated from the fine grained solid materials of the first component during the pyrolytic treatment of the mixture. Such separation is, for example, the case when anthracite and/or lean or non-bituminous coal are used.

The duration of the low temperature carbonization at a constant pyrolytic or decomposition temperature of 520° C. ±60° C. takes place for 2 to 12 minutes, that is, until the solidification of the bituminous material begins. The carbonization will take more time when the pyrolytic temperature decreases. Conversely, when the pyrolytic or decomposition temperature increases, the carbonization duration will be shorter. The carbonized mixed material is supplied to a form body press at the beginning of any solidification of the bituminous materials. Such a form body press can be of conventional construction and may, for example, be a so-called double roller press. The formation or pressing of the mixture should take place at the mixing and carbonization temperature. However, a small cooling of the mixed carbonized material prior to its pressing is permissible.

Surprisingly, the form bodies produced as taught by the invention have a sufficient rigidity and strength for any further handling or processing. The present bodies do not lose that mechanical strength even if they are subjected to further heating.

The carbon containing form bodies according to the invention may be further treated for further increasing their mechanical strength and heat resistance. Such further treatment involves keeping the pressed form bodies for up to 6 hours at the pressing temperature in the range of 460 to 590° C. ±50° C. Instead of this prolonged exposure to the pressing temperature the present form bodies may be heated to a temperature within the range of 640° C. to 1400° C. According to an alternative embodiment the prolonged exposure to the pressing temperature is advisable altogether and the pressed bodies are subjected to heating in the just mentioned range of 640° C. to 1400° C. for about 0.3 to 3 hours.

The optimal mixing and carbonization duration is characterized or determined by the maximal mechanical strength and shape retaining capability that is desired for the hot pressed bodies. If the carbonization has taken place for an insufficient length of time, the pressed bodies have a tendency to crack along the pressing seam. The cracks look like beaks. Therefore, the cracking is also referred to as "beaking". On the other hand, when the carbonization takes place for an excessive length of time, the carbonization residue of the bituminous material rapidly loses its binding capability. In both instances, the scuff resistance deteriorates. Therefore, the carbonization duration should neither be too long nor too short.

By providing a dwell time at the pressing temperature, the pyrolysis is continued. As a result, the carbonization coke formed of the bituminous materials in the mixture cause a further strengthening and solidification of the form bodies during the dwell time. After a dwell time of about 2 to 4 hours the formed or pressed bodies lose their initially clearly present sensitivity to sudden temperature changes as may, for example, occur by immersing the pressed bodies into cold water. On the other hand, after a sufficient length in the above mentioned dwell time, the form bodies produced according to the invention are of such a mechanical strength that they can be cooled down from their hot state either in an immersion bath or by spraying them simply with water.

A coke skeleton forms part of the form bodies produced according to the invention and generally that coke skeleton is stronger and more rigid than the coke skeleton formed in conventional form bodies made of coking hard coal. Such conventional form bodies have a carbonization coke content of normally about 30%. These conventional form bodies lose their mechanical strength when the carbonization coke skeleton content falls below 20%. On the other hand, the form bodies produced according to the method of the invention by using bituminous materials have a sufficient production and handling strength even for a carbonization coke skeleton content in the range of 10 to 20%. Another advantage of the form bodies according to the invention is seen in that undesirable side ingredients are further reduced due to the low coke content.

The rigid carbonization coke formed of the bituminous ingredients still contains remainder volatile components if it has not been heated to temperatures substantially above the pressing temperature. However, such remainder volatile components are acceptable for many purposes. For example, these remainder volatile components are acceptable normally for so-called form coke which is used as fuel or a reduction agent. These volatile components also are acceptable in so-called mixed cokes which are used in electrical furnaces for producing metals or carbides.

In those instances which require that remainder volatile components must be avoided, it is possible to separate such remainder volatile components by calcining the formed bodies. The calcination may be performed on the formed bodies immediately after the pressing operation. Calcined formed bodies are required, for example for the production of electrodes and carbon blocks. Electrodes and carbon blocks of this types are made of carbon carriers and are thus to be defined as different types of formed coke.

Depending on the type of use for which the form bodies made according to the invention are intended, very different starting materials having various compositions may be employed. Thus, the first component of the mixture may be selected from sand, phosphates, metal oxides, ores, lime, metals, blast furnace dust, steel mill dust, breeze, petrol coke, pitch coke, and volatile bituminous hard coal. At least two of the just listed components may be combined to provide the first component for the starting mixture. The second component comprises one or more of the following ingredients, namely bituminous materials, asphalts, tars, pitches, including hard pitch made of bituminous hard coal, and cracked bitumen made of crude oil. The ingredients of the second component are preferably those defined in German Industrial Standard (DIN) 55946.

Form bodies made as taught herein of the above listed ingredients have a rigid and normally low ash content skeleton of carbonization coke or of coke. This skeleton holds the formed bodies together so that they have a good shape retaining capability. As mentioned, the coke skeleton is formed by the pyrolytic decomposition of the bituminous ingredients or materials. Another advantage of the present form bodies is seen in that they have a low open pore volume as compared to their total volume, whereby the drum resistance and the scuff resistance of these form bodies is increased as compared to conventional form bodies.

Incidentally, the apparatus disclosed in the above mentioned British Pat. Publication (GB) 2,157,312 is suitable for performing the pressing step for forming the bodies according to the invention.

Although the invention has been described with reference to specific example embodiments it will be appreciated that it is intended to cover all modifications and equivalents within the scope of the appended claims.

What is claimed is:

1. A method for producing form bodies containing carbon, comprising the following steps:
    (a) preparing a two component mixture by mixing 50 to 85% by weight of the mixture of a first component and 50 to 15% by weight of the mixture of a second binder component with each other, said first component including at least one fine grained solid material having a softening temperature above 800° C. as a first temperature, said second binder component including at least one pyrolytically decomposable binding agent having a second temperature such that said first temperature is above a uniform mixing and deformation temperature while said second temperature is below said uniform mixing and defomation temperature,
    (b) sufficiently heating the mixture to said uniform mixing and deformation temperature to perform a pyrolysis and degassing of said second binder component without destroying a binding ability of said binding agent of said second binder component,
    (c) selecting said second binder component as an at least partially liquified bituminous material having a mean CCT-value above 20%,
    (d) keeping said mixture continuously in motion during said heating for about 2 to 20 minutes for said pyrolysis and degassing and removing any produced gases from the bituminous material, and
    (e) immediately forming said form bodies at a pressing temperature within a range of 460° C. to 590° C., as soon as a solidification and coking has started in the pyrolytically decomposed bituminous material.

2. The method of claim 1, further comprising keeping said form bodies at said pressing temperature for a duration of up to six hours, whereby said range may vary up to 50° C. below said 460° C. and up to 50° C. above said 590° C.

3. The method of claim 1, further comprising heating said form bodies to a temperature within the range of 640° C. to 100° C.

4. The method of claim 1, wherein said first component comprises at least on ingredient selected from the group consisting of sand, phosphates, metal oxides, ores, lime, metals, blast furnace dust, steel mill dust, breeze, petrol coke, pitch coke, low volatile bituminous hard coal, and wherein said second binder component comprises at least one ingredient selected from the group consisting of bituminous materials, asphalts, tars, pitches, and cracked bitumen.

5. The method of claim 4, wherein said bituminous materials, asphalts, tars, and pitches of said binder component satisfy the definition given in German Industrial Standard DIN 55946.

6. The method of claim 1, wherein said uniform mixing and deformation temperature of step (b) is within the range of low temperature carbonization at about 460° C. to about 580° C.

* * * * *

UNITED STATES PATENT AND TRADEMARK OFFICE
CERTIFICATE OF CORRECTION

PATENT NO. : 4,908,167
DATED      : March 13, 1990
INVENTOR(S) : Franz Beckmann, Armand Wagner It is certified that error appears in the above-identified patent and that said Letters Patent is hereby corrected as shown below:

Claim 3, line 3, replace "to 100°C." by --to 1400°C.--.

Signed and Sealed this

Twelfth Day of March, 1991

*Attest:*

HARRY F. MANBECK, JR.

*Attesting Officer*    *Commissioner of Patents and Trademarks*